April 14, 1936.　　M. L. JOHNSON ET AL　　2,037,135
RUG BEATER
Filed Aug. 30, 1934　　2 Sheets-Sheet 1
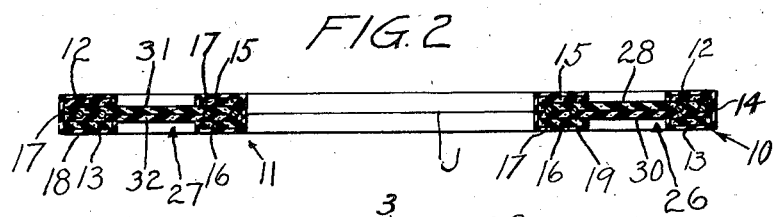
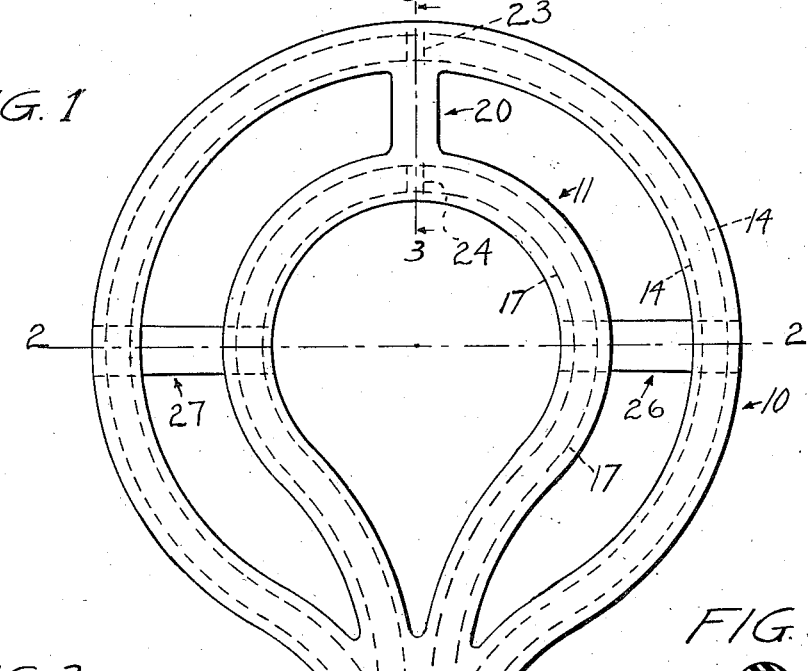
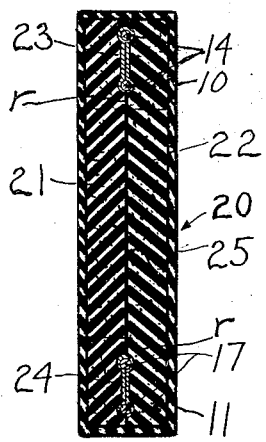
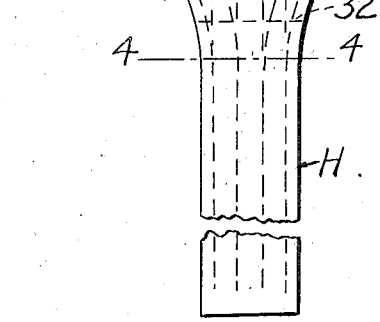
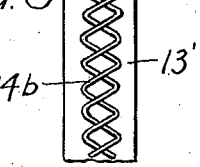
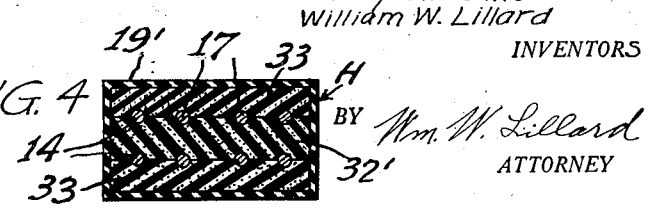
Mary L. Johnson
William W. Lillard
INVENTORS
BY Wm. W. Lillard
ATTORNEY April 14, 1936.  M. L. JOHNSON ET AL  2,037,135
RUG BEATER
Filed Aug. 30, 1934  2 Sheets-Sheet 2
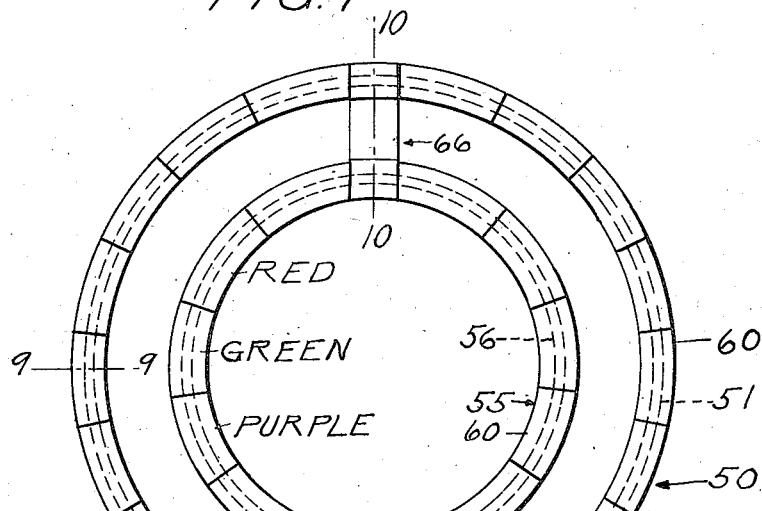
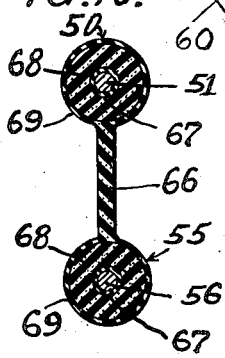
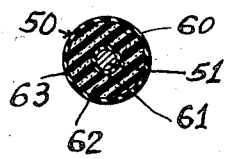
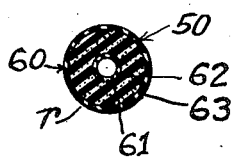
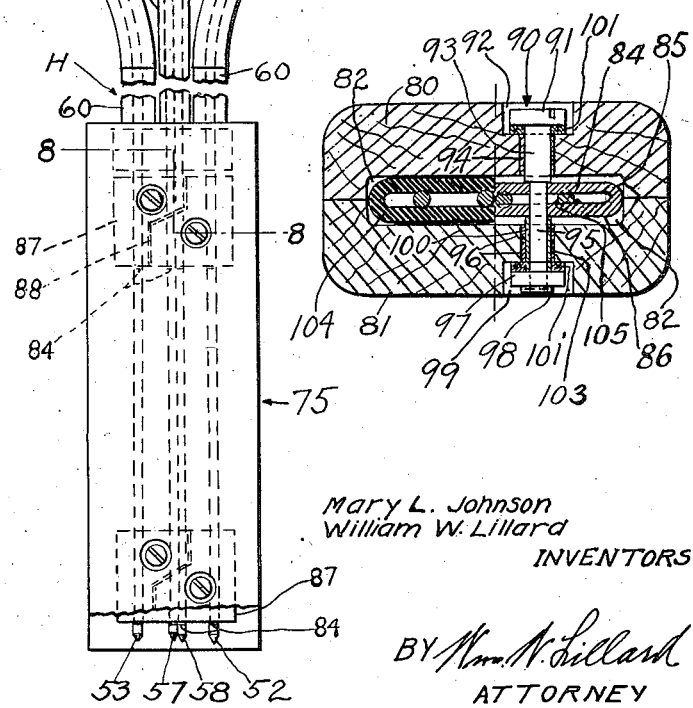
Mary L. Johnson
William W. Lillard
INVENTORS
BY *Wm. W. Lillard*
ATTORNEY Patented Apr. 14, 1936

2,037,135

UNITED STATES PATENT OFFICE 2,037,135

RUG BEATER

Mary L. Johnson, Mahwah, and William W. Lillard, Midland Park, N. J.

Application August 30, 1934, Serial No. 742,040

8 Claims. (Cl. 15—141)

The present invention relates to rug and carpet beaters. The rug beaters now in common use are usually made of metal, or of wood which is considerably harder than ordinary rugs. Such rug beaters are hard on rugs and carpets and materially shorten the lives of such rugs and carpets on which they are used.

An object of the present invention is to provide an improved rug beater of yielding material that will have little tendency to break or tear loose the threads of a rug, or otherwise damage it.

Metallic rug beaters covered with layers of thin rubber have been proposed. Such thin layers of ordinary rubber are usually not effective to prevent damage to rugs. Sponge rubber which is softer than so-called soft rubber in its common form is ordinarily too weak to use as a covering for a stiff frame work of a rug beater.

Another object of the present invention is to provide means whereby sponge rubber can be satisfactorily and strongly applied to metallic frame work for constructing a rug and carpet beater.

A feature of the present invention resides in a provision of means whereby a sponge rubber sheathing means for a rug beater can be easily removed and replaced by a fresh sheathing.

Other features and advantages of the invention will appear as the description proceeds.

With reference to the drawings which form a part of the specification:

Figure 1 is an elevational view of one form of rug beater which embodies our invention.

Figure 2 is a cross section along the line 2—2 of Figure 1.

Figure 3 is an cross-section to an enlarged scale along the line 3—3 of Figure 1.

Figure 4 is a cross-section along the line 4—4 of Figure 1.

Figure 5 is a cross-sectional view illustrating an advantageous construction of a stiffening member used in the faremwork of a rug beater embodying my invention.

Figure 6 illustrates an alternate form of metallic stiffener which may be employed with sponge rubber parts according to my invention.

Figure 7 is an elevational view, broken away in part, which illustrates another construction of a rug beater according to my invention.

Figure 8 is a cross-section along the line 8—8 of Figure 7 on an enlarged scale.

Figure 9 is a cross-section along the line 9—9 of Figure 7.

Figure 10 is a cross-section along the line 10—10 of Figure 7.

Figure 11 is an end view of a sheathing member.

With reference to Figures 1 to 4, there is shown a rug beater having an outer beater ring generally designated as 10, and an inner ring generally designated as 11. The outer ring 10 is made up of two circular strips of sponge rubber 12 and 13 disposed back to back, each of the strips preferably being made with an extra thick rind portion r on its back which abuts against a like rind portion on the outer strip. Between the strips 12 and 13, two stiffening wires 14 shaped as shown in Figure 1 are placed. In the same manner two stiffening wires 17 are placed between strips 15 and 16 of soft sponge rubber in the ring 11. The strips 15 and 16 will preferably be made with the same kind of rind portions mentioned in the connection with strips 12 and 13.

Around the strips 12 and 13 of the ring 10, and around the strips 15 and 16, rubber sheaths 18 and 19, respectively, are arranged to wholly inclose such strips.

The rings 10 and 11 are connected at the upper part of the rug beater by a tie member generally designated as 20 which is made up of two sponge rubber pieces 21 and 22 which may be integrally joined to and between the strips 12, 15 and 13, 16 respectively. The two spaced wires 14 in the ring 10 are connected at the location of the member 20 by a loop 23 of flexible material such as leather or rubber. The wires 17 in the ring 11 may be connected at the location of the member 20 by a loop 24 of the same material as used for the loop 23. A sheathing 25 is arranged to enclose the connecting member 20 and may be integrally joined to the sheaths 18 and 19.

The rings 10 and 11 may be connected at another point by a flexible connector 26 made up of strips 28 and 30 each being disposed on opposite sides of the wires 14. In like manner, the rings 10 and 11 may be connected at opposite points to the connector 26 by a flexible connector 27 made up of strips 31 and 31'.

The stiffener wires 14 and 17 may extend downwardly (as viewed in Figure 1) into handle member H of the beater and be arranged as shown in Figure 4 on each side of a central handle portion 32 of leather or rubber. The handle portion 32 terminates at 32e, shortly below the junction of the rings 10 and 11, and the upper end portion of the handle portion 32 is preferably tapered down to a dull knife edge. On each side of the central handle portion 32 is disposed a handle member 33 of flexible rubber or leather. All of the parts of the handle H may be covered with a rubber sheath 19' which may be integrally joined to the sheaths 18 and 19. It will be understood that the sheaths 18, 19, and 19' may all be made as two units, preferably as hollow shells which may be cemented or vulcanized together along joints (J Figure 2). It will be understood that the strips 12 and 15 and the strips 13 and 16 may be integrally joined at the upper end of the handle H.

In Figure 5, there is illustrated an advantageous way of constructing a stiffening wire for use in a rug beater embodying my invention. A spring steel wire 14' has a thin, tight fitting sheathing or covering 14c which is preferably made of rubber. Such a rubber covered stiffening wire when placed between the two sponge rubber strips such as the strips 12 and 13 will be more securely fastened to each strip when they are cemented or vulcanized together.

In Figure 6, there is illustrated another kind of metallic stiffening member which can be used in constructing the sponge rubber beater rings 10 and 11 in place of the wires 14 and 19. It will be understood that one length of flexible braided wire 14b may replace two of the flexible wires 14.

In Figures 7, 8, 9, and 10 there is illustrated a rug beater which shows a preferred form of the present invention and differs in certain respects from the structure of Figure 1. An outer beater ring 50 includes a stiffener member 51 which is preferably a resilient metallic wire or rod which may have the shape shown in Figure 7 and have both ends 52 and 53 pointed for a reason to presently appear.

An inner beater ring 55 may include a resilient wire stiffener member 56 of the same material as the member 51 and be formed similarly thereto, and have its ends 57 and 58 pointed.

Fitting tightly around the wire members 51 and 56 are a plurality of sheathing members generally designated as 60 which may be constructed as shown in Figure 9. Each member 60 has an inner tubular element 61 of soft elastic rubber, an intermediate filler element 62 of soft sponge rubber and an outer protective sheath 63 of thin tough flexible rubber. The three parts of each sheathing member 60 are strongly secured to each other which may be done by making the parts 61, 62 and 63 separately and cementing or vulcanizing them one to another. If desired, these parts may be integrally joined to each other during the manufacture of the sponge rubber parts 62, by means well understood by those skilled in the production and use of sponge rubber.

Some important advantages are obtained by making the sheathing of the rug beater of Figure 7 as a plurality of units 60 instead of as one sheathing member for each of the frame members 51 and 56. One of such advantages is that it is practicable to make a large number of the parts for making up the units 60 at one time from a set of gang molds, and thus secure lower manufacturing costs. This is possible since the parts of one unit obviously may be duplicates of the parts of the other units excepts as to color, and for a large number of rug beaters there will be many of the above noted parts of the same color. Another advantage obtained is that the short lengths of the units as compared with the total length of a wire frame member will permit a unit 60 to turn about its frame member should a severe strain be brought on the unit which tends to tear it aloose from the frame member and to turn it angularly therearound. The turning of the unit in such case, will partly relieve the strain tending to cause the unit to be torn from the frame member. Such turning is facilitated by the arrangement of the tubular element 61 and the sheath 63 with the sponge rubber therebetween.

The rings 50 and 55 are shown fastened to each other at their forward extremities by a rubber connector 66 which may be constructed as shown in Figure 10 and include inner rubber sheath elements 67, sponge rubber filler elements 68, outer sheath elements 69 and a connecting web member 70 integrally joined to each sheath element 69. Additional connectors may be employed, if desired, and be positioned similarly to the connectors of the Figure 1 structure.

Between the inner end of the beater ring 55 and a hand piece 75 of a handle H', the two portions of the wire 56 may pass through a single sheathing member 76 constructed like the sheathing member 60 and be stretched to take two wires 56. Below the member 76, the two wires 56 may be sheathed by a short tubular section of soft rubber 77. If desired, the lower end portions of the wire 56 may be spaced apart far enough to permit the use of sheaths 60 on each end portion as is shown for the wire 51, or the end portions of the wire 56 may be so spaced that the sheaths are slightly compressed in a similar manner to the compression of the sheath members 60 at 78.

A feature of the present invention resides in the provision of means which permits a sponge rubber sheathing such as is disclosed hereinbefore to be easily removed from the stiffening members of the rug beater and be readily replaced by fresh sheathing members. According to this feature, the hand piece H' includes two hand piece portions 80 and 81 which may be made of wood or hard rubber or other suitable material. Each of the portions 80 and 81 may have a shallow lengthwise groove 82 which cooperate to form a lengthwise rectangular cavity through the hand piece 75. Two end portions of the wire 51 and the wire 56 are disposed in the cavity and extend nearly all the way through the hand piece 75, and stop a short distance from its lower end (see Figure 7).

To releasably fasten the wires 51 and 56 to the hand piece 75, each end portion of the wires 51 and 56 is made with two pairs of flattened sections 84. Each pair includes a flat on the top of the wire and an opposite flat on the bottom of the wire. Such flattened sections are disposed between a downwardly pressed upper portion 85 and a lower portion 86 of a locking link member generally designated as 87 which is preferably made from a single strip of steel having a suitable spring temper and shaped as shown in Figures 7 and 8 with the ends of the strip correspondingly cut as indicated in Figure 7 to provide a kind of diagonal joint 88 in the upper link portion 85 for a reason presently to appear. It will be noted that the lower edge (as viewed in Figure 7) of each link member 87 is disposed in close proximity to the shoulder at the lower end of each flattened wire section 84. To press the upper and lower link portions tightly against the flattened wire sections 84, the following means may be employed. A shoulder screw generally designated as 90, has a head 91 seated in a recess 92 in the hand piece portion 80 and a body portion 93 extending through an oversized hole 94 in the portion 80. The lower end of the body portion 93 is seated on the upper link portion 85 and reduced shank portion 95 of the screw 90 extends through closely fitting holes in the upper and lower link portions 85 and 86 and on through an oversized hole 96 in the hand piece member 81 to receive a nut 97 and a locking nut 98, both nuts being countersunk into a recess 99 in the hand piece member 81.

A metallic sleeve 100 is disposed around the shank portion 95 between the nut 97 and the lower link portion 86. A washer 101 of suitable yielding material such as cork or fiber is disposed between the screw head 91 and the bottom of the recess 92, and another washer 101' is disposed between the nut 98 and the bottom of the recess 99 (upper extremity of the recess as viewed in Figure 8). The last named washer has a hole for receiving the sleeve 100. In some cases, it may be desirable to have a thin bushing or sleeve 103 of cork or other yielding material disposed around the screw body portion 93 and the sleeve 100, such sleeves 103 to fit tightly in the holes through the hand piece portions 80 and 81.

Four of the screws 90, each with the above noted associated parts, can be advantageously used with one hand piece 75, and may be positioned as shown in Figure 7. It can be seen that each of the right hand screws 90 with each locking member 87 when tightened down binds the stiffening wires having pointed end portions numbered 52, 57 and 58. Each of the other i. e. the left hand screws 90 when tightened down binds the stiffening wire having a pointed end portion 53. If desired, each of the screws 90 and the strip portions 85 and 86 may be arranged to bind two stiffening wires. In such case, the two centrally positioned, adjoining wires should be spaced apart.

When all the screws 90 and nuts 97 and 98 are properly tightened, the stiffening wires 51 and 56 will be tightly secured in the hand piece 75. Also, it will be noted that the yielding cork washers 101 and 101' cooperate with the locking nuts 98 and strip portions 85 and 86 to prevent the screws 90 from being loosened.

Disposed in the hollow of the hand piece 75 adjacent its forward end is a cushioning sleeve 104 which may be made of soft leather or rubber. When disposed in its operative flattened form on each side of the stiffening wires 51 and 56 as shown in Figure 8 it will preferably fit tightly between the hand piece portions 80 and 81 and will have the stiffening wires partly embedded in it. The sleeve 104 serves two purposes. It prevents the flexible wires 51 and 56 from striking the hand piece 75 when the wires are bent considerably by a severe blow; and it holds the wires against lateral displacement in the hand piece 75. Other means such as boss elements 105 on the strip portions 86 may also be used to prevent lateral displacement of the wires 51 and 56. The hand piece 75 will preferably have knurled surfaces (not shown) of a well known kind to facilitate holding it securely in one's hand.

To remove the rubber sheathing members 60 from the wires 51 and 56, the screw 90, the hand piece portions 80 and 81, and the locking members 87 will be removed and the sheathing members stripped off the wires 51 and 56 by hand operations. Fresh sheathing members may then be slipped over the wires, the pointed end portions 52, 53, 57 and 58 being arranged to facilitate the starting of the sheathing members on over the wires 51 and 56. It will be noted that no portion of the wires adjacent the locking members 87 is increased in cross-section which if done would hinder the ready movement of the sheathing members along the wires.

It can be readily seen from the foregoing disclosure that one or more additional beater rings of similar construction to that of the rings 10 and 55 can be incorporated in a rug beater of the construction illustrated in Figure 1 or in Figure 7. Additional ring members may be made up to include sheathing members of the same construction as the members 60 and may be of any desired length. Also it will be understood that the sheathing members 60 may be made with rind membranes on both ends of each sponge rubber portion 62 as indicated in Figure 11, or with such ends having the cells of the sponge rubber exposed. Such exposed cells will be covered up when the sheathing members 60 are in operative position, however, since such members 60 will fit tightly against each other, end to end.

Another feature of the present invention resides in the provision of means whereby a rug beater can be made in several colors so as to add to its attractiveness. One means for carrying out this feature is illustrated in Figure 7, wherein it is indicated that certain of the sheathing members 60 are differently colored. If desired, each of the sheathing members 18 and 19 may be made in two longitudinally divided portions, each differently colored. Such portions may be integrally joined along joint lines such as the joint J.

Another feature of the present invention resides in the provision of inexpensive means which make it readily possible to furnish rug and carpet beaters of different degrees of softness for use with different kinds of rugs and carpets. Such a feature can be attained by making the sponge portions 62 of different degrees of softness. In some cases, advantages are secured by making certain of the sheathing members 60 in a rug beater of a different degree of softness from that of other sheathing members in the same beater. If the sheathing members 60, adjacent the outer end of a rug beater of Figure 7 construction are made softer than the sheathing members adjacent the inner end a more uniform pressure will be applied to rugs and carpets beaten by such a rug beater.

It can be readily seen by those skilled in the manufacture of rubber articles that rug beaters embodying our invention may be made in some respects differently from the construction described hereinbefore without departing from the spirit of our invention. For example, the sheaths or skin members 18 and 19 may be made as one member by a well known latex dip process. Also, it can be readily seen that the handle of the Figure 1 structure can be used on the Figure 7 structure, and vice versa.

Having described our invention we claim:

1. A rug beater including a frame of resilient metallic wires, a handle fastened to said frame, soft cellular sponge rubber sheathing for the portions of said wires external to said handle, said sheathing being much greater in diameter than the thickness of said wires, and means for detachably fastening said sheathing securely on said wires and protecting said sheathing while in use from excessive strains which tend to tear the relatively weak sponge rubber from said wires, said fastening and protecting means including tubular, elastic rubber cores fitting tightly around said wires, said sponge rubber sheathing inclosing said cores and being secured thereon, said fastening and protecting means further including soft rubber casing elements inclosing said sponge rubber sheathing, said cores and said casing elements being thicker and tougher than ordinary sponge rubber rind.

2. A rug beater including a frame of resilient metallic wires, a handle, all of the ends of said wires being fastened in said handle, sheathing means for said wires including soft cellular sponge rubber members, one of said rubber members being arranged on each side of said wires to enclose the same, means stronger than sponge rubber for fastening the same to said wires, said fastening means including rinds on the inner faces of said sponge rubber members, said rinds being vulcanized together to tightly grip said wire members and a flexible non-porous means for encasing said sponge rubber members.

3. A rug beater including a frame of resilient wire members formed in loops, sheathing means for the forward end portions of said wire members including a plurality of relatively short cylindrical members of soft sponge rubber, each of said cylindrical members having a lengthwise hole through it for receiving one of said wire members, the inner ends of said wire members being disposed adjacent each other, a handle arranged to inclose said inner end portions, means for releasably fastening said wires to said handle, and a separately formed tubular fastening member arranged in the hole in each of said cylindrical members for tightly engaging the wire member passing therethrough, said tubular fastening members being arranged that said cylindrical members may be slipped along over said wires to be operatively positioned thereon.

4. In a rug beater having a flexible wire frame, a sheathing unit for covering a short portion of said frame, said unit including a thin-walled, elastic, tubular core element having an internal diameter relatively small with respect to that of said unit, a bushing element of soft sponge rubber having a much thicker wall than said core element which it surrounds, and a thin tough, flexible, rubber covering for enclosing said sponge rubber bushing element, the same being integrally joined to said core element and to said covering so as to be reinforced against tearing strains during the use of said beater.

5. In a rug beater, a frame formed of loops of wire, a sheathing for said wire including a plurality of short tubular sponge rubber sheathing units, said sheathing units being individually rotatable on said wire.

6. In a rug beater, a frame member including a loop of spring tempered, smooth wire, the ends of said wire loop being disposed adjacent each other, a hand piece to be held by the operator, means for releasably gripping the loop end portions in said hand piece, and a plurality of soft rubber sheathing units, each arranged with an elastic core element effective to be slipped over said loop ends and along the wire to an operative position thereon, said core elements each being stretched normally a small amount for securing its unit on said wire against lengthwise movement, said gripping means including clamping devices carried by said hand piece for engaging said wire, and formations on said end portions arranged for cooperation with said clamping devices, said formations each having a cross-section less than the normal cross-section of said wire end portions, and shaped to permit said elastic core elements to be passed readily thereby.

7. A sheathing for a wire frame of a rug beater, said sheathing including a body portion of soft sponge rubber surrounding said wire frame, said sponge rubber having a working life the length of which is adversely affected by exposure to atmospheric elements under usual work conditions, a soft rubber fastening means internally disposed in said body portion for gripping the same to said frame, the sponge rubber of said body portion being shielded by said fastening means from air entering said sheathing along said frame, and an airtight, flexible rubber covering for the outer surfaces of said body portion, said fastening means and said covering being substantially thicker and more impervious to air than ordinary sponge rubber rind, and arranged for cooperating to render all of the sponge rubber of said body portion inaccessible by elements of the atmosphere.

8. A blow-cushioning device for assembly on a wire frame of a rug beater, said device comprising a tubular sponge rubber member shorter than said frame and having an outside diameter at least several times the diameter of the wire in said frame, the sponge rubber in said tubular member being fully sheathed at all points by elastic rubber thicker than ordinary rind elements of sponge rubber, the inside diameter of said tubular member being approximately the same as the diameter of said wire.

MARY L. JOHNSON.
WILLIAM W. LILLARD.